Nov. 21, 1950     H. F. MINTER     2,530,983
HYDROXY ESTER ANHYDRIDE COPOLYMER
Filed March 8, 1947
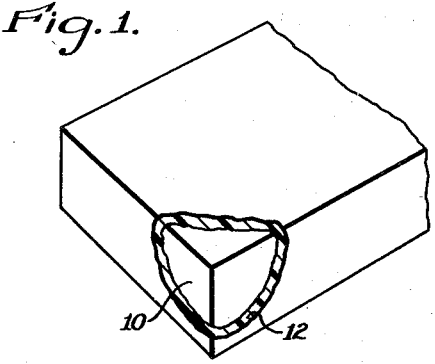
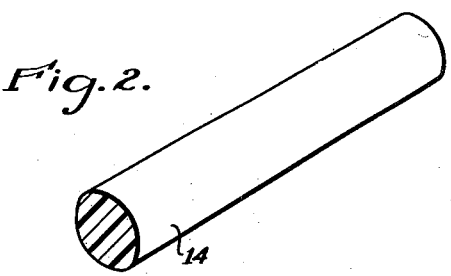
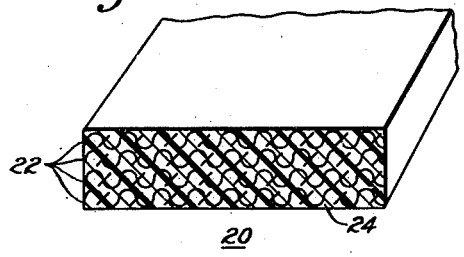
WITNESSES:
Robert Baird
INVENTOR
Herbert F. Minter.
BY Frederick Shapoe
ATTORNEY Patented Nov. 21, 1950

2,530,983

UNITED STATES PATENT OFFICE 2,530,983

HYDROXY ESTER ANHYDRIDE COPOLYMER

Herbert F. Minter, Pittsburgh, Pa., assignor to Westinghouse Electric Corporation, East Pittsburgh, Pa., a corporation of Pennsylvania Application March 8, 1947, Serial No. 733,415

9 Claims. (Cl. 154—140)

This invention relates to complex resinous polymers, processes for employing the polymers, and products produced therewith.

It is desirable in preparing resinous products to have available resinous materials possessing a definite intermediate solvent soluble, thermoplastic (B) stage and capable of being cured into a thermoset, infusible and insoluble product. Furthermore, it is desirable that materials during the process of conversion into the thermoset state produce no significant or substantial amount of moisture, gases or other undesirable substances. The avoidance of the evolution of gases or moisture is advantageous in that bodies of the resinous materials may be produced without the requirement of the use of extremely high pressures in converting them to a cured state as is necessary at the present time as in molding phenolic resins for instance.

According to the present invention there are produced resinous complex polymers possessing a definite thermo-plastic and solvent soluble (B) stage. These polymers may be applied in solution to various fabrics or fillers, such as wood flour, to impregnate them and upon drying the treated fabrics or fillers may be molded into thermoset composite materials possessing excellent physical and other properties. Alternatively the B stage polymers may be prepared in the form of powders that may be extruded or molded, with or without various fibrous, powdered, or liquid additives, into various members wherein the polymers are in a thermoset state.

The object of this invention is to provide a thermosettable resin having an intermediate fusible and soluble (B) stage, which resins may be converted into a thermoset state without any substantial amount of water or gas being given off.

A further object of this invention is to provide a process for producing members embodying a resinous complex polymer.

A still further object of the invention is to provide for a thermoset resinous member characterized by freedom from cavities and pores due to evolved gases and moisture, as well as freedom from other flaws.

Other objects will in part be obvious and will in part appear hereinafter.

For a fuller understanding of the nature and objects of the invention, reference should be had to the following detailed description and drawing in which:

Fig. 1 is a partially broken perspective view of a film or coating of the cured resinous polymer on a base member, Fig. 2 is a perspective view of a molded rod of the cured polymer, and Fig. 3 is a laminate embodying the thermoset polymer.

The novel complex polymers of the present invention comprise the hydroxy ester reaction product of (A) the thermoplastic vinyl-type copolymer of an organic acid having a single $>C=C<$, an organic acid anhydride having a single $>C=C<$ group and a non-acidic polymerizable monomer having a single $H_2C=C<$ group, the copolymer having no polymer-forming ethylenic groups and (B) an epoxide, the epoxide forming an ester by reaction with the carboxyl groups of the organic acid alone. The hydroxy ester reaction product is soluble in various solvents producing solutions of low viscosity.

The expression "organic acid" is used herein to include compounds having one or more carboxyl groups and which do not contain a free alcohol type of hydroxyl group, amino group, or other readily reactive group other than the $>C=C<$ group. Examples of suitable organic acids are maleic acid, chloromaleic acid, fumaric acid, acrylic acid, β-crotonic acid, methacrylic acid, α-chloroacrylic acid, β-chloroacrylic acid, cinnamic acid, citraconic acid and aconitic acid. By organic "acid anhydride" it is intended to include anhydrides derived from organic acids which do not contain a free alcohol type of hydroxyl group, amino group, or other readily reactive group other than the $>C=C<$ group. Examples of organic acid anhydrides suitable for the practice of the invention are maleic anhydride, chloromaleic anhydride, itaconic anhydride, and citraconic anhydride.

The expression "epoxide" is used herein to include all compounds having an oxygen group attached to each of two successive, connected carbon atoms and which do not contain an acidic or free alcohol type of hydroxyl group or other readily reactive group. In general, the epoxides have the oxygen atom in a saturated aliphatic group. In some cases the aliphatic group may be attached to an aryl radical. Suitable epoxides are, for example, ethylene oxide, propylene oxide, butylene oxide and styrene oxide.

Non-acidic polymerizable monomers having a single $H_2C=C<$ group suitable for reaction to make the products of this invention are, for example, monostyrene, nuclearly chlorinated styrene, such as parachlorostyrene and 2,4-dichlorostyrene; vinyl acetate, vinyl butyrate and similar vinyl esters, vinylidene chloride, vinyl ketone, acrylic and methacrylic acid esters, such as methyl acrylate, ethyl acrylate and methylmethacrylate; vinyl ethers such as butyl vinyl ether, and acrylonitrile.

It has been found that the most desirable results are secured if the copolymer (A) is prepared by reacting substantially one mole of the organic acid having a single $>C=C<$ group and at least about one mole—from 0.9 to 2 moles being used in practice—of the organic acid anhydride for each carboxyl group in the organic acid. Thus for one mole of maleic acid 1.8 to 4 moles of an acid anhydride, such as maleic anhydride, may be employed while with one mole of acrylic acid from 0.9 to 2 moles of maleic anhydride are used.

In view of the difficulty of securing vinyl type polymerization using only organic acids and anhydrides, it is necessary to introduce a minimum of substantially one molecule of a polymerizable non-acidic monomer having a single $H_2C=C<$ group for each molecule of the organic acid and the acid anhydride to produce vinyl type linear polymers. A maximum of 5 molecules of the non-acidic monomer per organic acid and anhydride molecule may be introduced if optimum thermosetting properties in the final cured polymer are to be secured. However, up to 20 non-acidic monomer molecules for each organic acid and anhydride molecule may be introduced with some thermoset properties being realizable. With the maximum amount of the non-acidic monomer, the products are more resilient and not entirely insoluble and infusible.

The following example, in which all parts are by weight, illustrates the preparation of the copolymer:

Example I

| | Mole ratio |
|---|---|
| Acrylic acid, 29.86 parts | 1 |
| Maleic anhydride, 40.6 parts | 1 |
| Monostyrene, 129.5 parts | 2 |

The acrylic acid and maleic anhydride were placed in a reaction vessel equipped with a stirrer, a dropping funnel, a reflux condenser, a thermometer and a heater. Into the vessel there were introduced 100 parts by weight acetone to dissolve the acrylic acid and the maleic anhydride, and 2 parts by weight of tertiary butyl perbenzoate as a catalyst. The solution was heated to the reflux temperature with stirring and the monostyrene was added slowly thereto. The refluxing was continued for an additional period of two hours after all the styrene was added, the temperature not exceeding 65° C. Refluxing has been continued for as much as 6 hours longer. Completion of the reaction may be determined by successive measurements of viscosity until a constant value thereof is obtained, or by precipitating a sample of the reaction product in a non-solvent and examining the resinous solid precipitate, or otherwise.

The following equations indicate the reaction leading to the formation of a vinyl-type copolymer taking place:

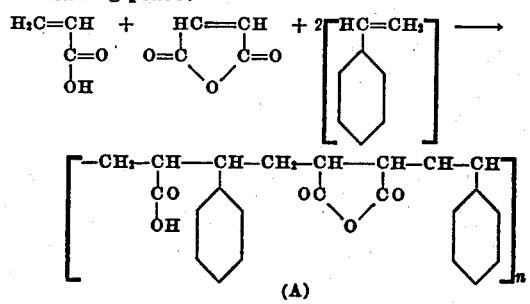

(A)

The linear copolymer (A) is preferably treated with an epoxide (B) while it is still in solution in the reaction vessel. While the epoxide preferentially reacts with the carboxyl groups of the organic acid, a slight excess over this amount is usually employed. In a typical instance 26½ parts by weight (1.1 mole ratio) of propylene oxide was added dropwise to the solution in Example I while stirring and refluxing. Refluxing was continued for at least one hour following the addition of the propylene oxide. Refluxing for as much as 3 hours may be required to obtain complete reaction.

The following thermoplastic complex resinous hydroxy ester copolymer was produced:

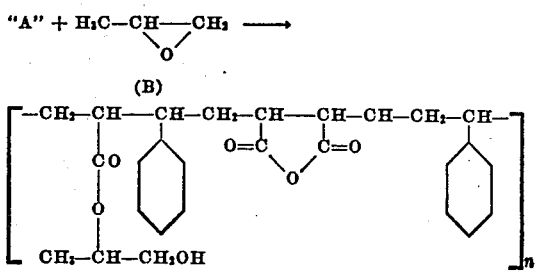

A feature of the reactions of Example I is the absence of water of condensation or other gaseous side products. This eliminates the necessity of condensing out water vapor or using other moisture removing expedients. It also makes it certain that the resins are water free at all times, providing anhydrous ingredients are employed.

In producing the resinous polymer, it is desirable to employ non-alcoholic solvents. The solvents selected should have boiling temperatures of below 100° C. to prevent inadvertent thermosetting of the reaction product after addition of the epoxides. The presence of a large volume of solvent in the reaction vessel reduces the possibility of undesirable thermosetting of the resinous reaction product. It has been found that the reaction may be safely carried out using only 40% solvent by weight and 60% reactants. Suitable solvents are acetone, mixtures of acetone and benzene or toluene, methyl ethyl ketone, diethyl ketone and the like.

Suitable catalysts for use in the reaction producing the copolymer (A) are benzoyl peroxide, acetyl benzoyl peroxide, and tertiary butyl perbenzoate and similar peroxide and ozonide vinyl type catalysts.

The complex hydroxy ester copolymer is readily soluble in the acetone or other solvent to produce a low viscosity syrup (from as low as 5 seconds #1 Demmler cup to 2500 seconds for more viscous solutions) suitable for impregnating paper, cloth or other materials. Coatings thereof may be applied to members by painting, dipping or spraying the solution and evaporating the solvent. Upon baking at a temperature of as low as 75° C. to as much as 200° C. and higher, the resinous coatings can be cured into a thermoset product of extreme hardness, infusibility and insolubility. The thermoset resin produced is believed to have the following molecular configuration:

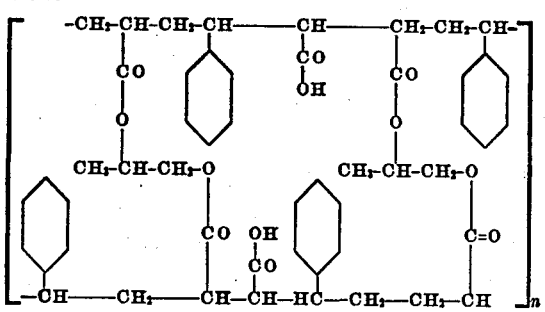

Cross-linking of only two chains of the copolymer is shown, but it is obvious that three dimensional polymers will occur due to cross-linking of many chains due to the reaction shown. It will be apparent that the polymer chains in the thermoset state are cross-linked by the ester reaction of the acid anhydride with the hydroxy group of the ester derived from the epoxide, without the evolution of moisture.

By varying the proportion of the non-acidic polymerizable monomer from a minimum of 1.9 moles for each mole of the organic acid to 10 moles per mole of organic acid the properties of the thermoset copolymer may be changed to meet requirements. The products produced with the minimum (1.9 moles) of polymerizable monomer are extremely hard to the extent of being brittle when cured to a thermoset state without a filler, whereas the thermoset products with 10 moles of the polymerizable monomer for each mole of the organic acid are still relatively hard, but possess considerable toughness.

The properties of the final cured polymer may be modified by suitable control over the time and conditions of the reaction producing the hydroxy ester copolymer. A short reaction time results in a low degree of polymerization. The copolymer so produced dissolves to provide penetrating, low viscosity solutions. Longer reaction times increase the average molecular weight of the copolymer and solutions thereof are accordingly more viscous. The thermoset products are correspondingly harder and more brittle with the higher molecular weight products.

Referring to Fig. 1 of the drawing, there is illustrated a base member 10 which may be metal, wood, ceramic, or other solid, to which there has been applied a coating 12 of the hydroxy ester copolymer as a solution in acetone or other suitable solvent and dried to evaporate the solvent, thereby depositing a coating of the thermoplastic resinous copolymer on the base member. Thereafter the base member was heated to an elevated temperature of from 75° C. to 200° C. or higher for a period of time sufficient to thermoset the polymer. A hard adherent coating of infusible and insoluble resin was thereby produced on the member 10.

Admixing the acetone resin solution of Example I in a non-solvent, such as water, methanol, ethanol or mixtures with benzene, preferably cold, precipitates the resin as a fibrous powder that may be readily employed for molding purposes. The precipitated powder may be admixed with mold lubricants, such as calcium stearate; powdered fillers or coloring materials, such as iron oxide, graphite, organic dyes or the like; and fibrous fillers, such as asbestos fiber, wood flour, cotton fibers or the like. The resin powder, with or without such additions and fillers, may be molded in a heated die at a pressure of as low as 10 lb. per square inch, although pressures of about 100 lb. per square inch and higher are preferable since the consolidation is improved. Temperatures required to convert the resins to a thermoset stage may be as low as 75° C., although the curing period at this temperature is several hours in length. At 150° C. the curing time is one-half hour or less, while at 200° C. the resin cures in a few minutes into a thermoset polymer. Solid members, such as the cylindrical rod 14 of Fig. 2, without any filler or addition, except organic dyes, present, are very hard, transparent resinous bodies. The moldings may be used for windows, table tops, illuminated signs, ornaments and insulating coil forms or supports, or for other purposes.

Solutions of the polymer in a volatile solvent, such as a ketone, may be applied to fibrous materials, for example paper, cloth, asbestos cloth, asbestos paper or glass fabric and the solvent evaporated by a brief heating. Thereafter the treated fibrous material, either in sheet form, or macerated or chopped, may be subjected to heat and pressure to produce molded or laminated members.

Referring to Fig. 3 of the drawing, there is illustrated a laminated 20 comprising a plurality of bonded layers 22 composed of fibrous sheet material 24 impregnated and bonded with the thermoset resin polymers of this invention. The following example is illustrative of the preparation of a laminate.

Example II 16 sheets of 15 mil thick asbestos paper were immersed in the acetone solution of the resinous copolymer of Example III, below, and dried by heating for three minutes at 135° C. The treated sheets were found to comprise 68% by weight of asbestos and 32% by weight of the resin. The 16 sheets of treated paper were then stacked and pressed for one hour at a pressure 1000 p. s. i. at a temperature of 150° C. into an integral laminate. Pressures of as low as 10 p. s. i. may be employed but the most dense and best consolidated products are secured with pressures of from 100 p. s. i. to 1000 p. s. i. The resulting laminate was an extremely hard member of a thickness of about ¼ inch. It resisted cracking or chipping even when pounded sharply. It possessed a high surface smoothness. Tests of the flexural strength at room temperature (27° C.) gave a value of 14,000 p. s. i. When tested at 150° C. for flexural strength, a value of 9000 p. s. i. was secured. This is an exceptionally high strength value at this temperature for a resinous laminate. The arc resistance was 170 to 190 seconds (A. S. T. M. test method).

The following additional examples of the preparation of the reaction products are illustrative of the invention:

Example III

| | Parts |
|---|---|
| Acetone | 100.0 |
| Maleic anhydride | 62.86 |
| Maleic acid | 37.2 |
| Tertiary-butyl perbenzoate as a catalyst | 2.0 |

The solution was heated to reflux temperature with stirring, when dropwise addition of 100.0 parts of styrene was begun.

After refluxing the reactants for a period of from 2 to 6 hours, 40.8 grams of propylene oxide was added dropwise and refluxing continued for 1 to 3 hours further. The product was a (B) stage resin. The solution in the reaction flask was suitable for use in impregnating and treating various fibrous materials. In this example, the mole ratio of styrene to maleic acid to maleic anhydride was approximately 3:1:2. Propylene oxide was in a slight excess of 2 moles per mole of maleic acid.

Example IV

The following reactants were simultaneously added into a reaction vessel:

| | Mole ratio |
|---|---|
| Maleic anhydride, 25.7 parts | 2 |
| Maleic acid, 15.2 parts | 1 |
| Monostyrene, 109.2 parts | 8 |
| Acetyl benzoyl peroxide, 1.5 | |
| Acetone, 150 | |

The reaction vessel was heated to the reflux temperature of the acetone in 14 minutes, refluxed for 46 minutes, then 16.75 grams of propylene oxide were added, and the refluxing continued for 20 minutes longer. The solution was applied to asbestos paper and the acetone evaporated. The treated product comprised 32.3% resin and 67.7% asbestos. A 30 mil thick laminate was prepared by superimposing several sheets of the treated product and molding at 1000 p. s. i. at 160° C. for half an hour. The stiffness in flexure was 976,000 p. s. i.

While it is preferred to prepare the copolymer first before introducing the epoxide for reaction with the carboxyl groups in order to avoid the possibility of premature reaction between the epoxy group and the acid anhydride, I have admixed the organic acid, acid anhydride, the polymerizable monomer and an epoxide along with a solvent and catalyst and reacted them simultaneously to produce the complex hydroxy ester copolymer.

Example V

| | Parts |
|---|---|
| Maleic anhydride | 23.3 |
| Crotonic acid | 10.2 |
| Monostyrene | 86.4 |
| Acetone | 180 |

The reactants were refluxed sixty minutes more after the slow addition of the monostyrene. Thereafter 7.58 parts of propylene oxide were added and refluxed for two hours in addition. The mole ratio of styrene to crotonic acid was 7 to 1.

The solvent-free resin of Example V was admixed with asbestos fibres in a weight ratio of 1 part of resin to 2 parts of asbestos. The loose, fibrous mixture was pressed at 350 p. s. i. while being heated at 150° C. for one-half hour to produce a hard member which withstood severe pounding and banging without any flaking or cracking. The hardness value on a durometer D tester was 90 to 95.

Example VI

| | Mole ratio |
|---|---|
| Maleic anhydride, 45.7 parts | 1 |
| Vinyl acetate, 120.7 parts | 3 |
| Acrylic acid, 33.64 parts | 1 |
| Acetone, 100 parts | |

The reactants were refluxed for two hours after the addition of the vinyl acetate to the mixture of acrylic acid and maleic anhydride, and then propylene oxide was added in an equimolar ratio with the vinyl acetate. A syrupy solution of the potentially reactive thermoplastic copolymer was secured.

Example VII

| | Parts |
|---|---|
| Maleic anhydride | 21.7 |
| Maleic acid | 12.9 |
| Monostyrene | 115.2 |
| Acetone | 150 |
| Tertiary-butyl perbenzoate as a catalyst | 1 | were reacted for three hours after the addition of the monostyrene. The mole ratio of monostyrene to maleic acid was 10 to 1. Thereafter, two moles of propylene oxide for each mole of maleic acid were added and the product refluxed for an additional hour. The solution was suitable for producing tough but hard thermoset resinous bodies upon removing the solvent and curing.

The resin solution of Example VII was applied to glass cloth cuttings and, after drying to evaporate the solvent, the threaded glass cloth cuttings were chopped into a finely divided state. The choppings were molded in a hot press at 135° C. for one hour while at a pressure of 1000 p. s. i. The resulting thermoset molding was hard and translucent.

Glass cloth laminates prepared with the resin of Example VII were hard and strong, and so well bonded that edge delamination could not be observed even by roughening up with a file. A knife blade would not separate the plies.

Example VIII

Into a reaction vessel containing 360 parts by weight of acetone there were introduced 42 parts of maleic anhydride, 24.5 parts of maleic acid and 2.4 parts of acetyl benzoyl peroxide. While stirring the vessel contents at the reflux temperature (62° C.–65° C.) 153.6 parts of monostyrene were added slowly. The mole ratio of maleic anhydride to maleic acid to monostyrene was 2:1:7. After the addition refluxing was continued for another hour and then 55.8 parts of styrene oxide were introduced slowly into the solution. The reaction was completed after one additional hour of refluxing. The resulting solution, when applied to asbestos paper, dried to remove the solvent and pressed at 1000 p. s. i. at 160° C. for thirty minutes produced a hard laminate.

In order to provide for a more flexible treated sheet material carrying the dry hydroxy ester copolymer, but prior to final complete curing, a reactable hydroxy plasticizer comprising a long carbon chain (at least four carbon atoms) aliphatic monohydric or polyhydric alcohol may be added. The reactable alcoholic hydroxy compound is a non-cyclic aliphatic with substantially no polymer-forming ethylenic groups and no groups reactable with an acid anhydride other than the hydroxy group. Examples of suitable reactable plasticizers are butyl alcohol, octyl alcohol, diethylene glycol, nonaethylene glycol and castor oil. The reactable hydroxy plasticizer may be added in any required amount up to sufficient moles thereof to react with any excess of maleic anhydride over that amount required to react with the hydroxy groups supplied by the reaction of the epoxide. Up to one mole of the hydroxy compound may be added per mole of the monoethylenic carboxylic acid. While the reactable hydroxy plasticizer may be added at any time during the reaction, it is preferred to introduce it with the epoxide or after the epoxide has been reacted. Prior to full curing the plasticizer is not reacted fully with the anhydride in the copolymer. Paper or cloth treated with the plasticized hydroxy ester copolymer is soft and easily formable thereby facilitating molding of complex shapes therefrom. The following example is illustrative:

Example IX

Into a reaction vessel there were introduced

| | Parts |
|---|---|
| Maleic anhydride | 31 |
| Maleic acid | 12.25 |
| Monostyrene | 76.8 |
| Tertiary butyl perbenzoate | 1.2 |
| Methyl ethyl ketone | 180 |

The materials were brought to reflux and refluxing was continued for three hours (at 89° C.–84° C.). Then 13.5 parts propylene oxide and 12 parts castor oil were added and refluxed for an additional 30 minutes. Asbestos paper treated with the resulting solution and dried to evaporate the solvent was soft and could be rolled or shaped without cracking or breaking apart. Laminates prepared therefrom by curing to a thermoset state were hard and tough. The durometer D hardness was 90.

Standard electrical tests of the asbestos paper laminate gave the following test values:

Arc resistance_____ 185 seconds
Dielectric strength — 30 mil thick sample:
    Short time_____ 351 volts per mil
    Step by step_____ 363 volts per mil
Surface resistance_____ $5 \times 10^5$ megohms
Dielectric constant_____ 8.9
Power factor:
    800 volts_____ 14.8%
    1500 volts_____ 17.0%

Non-reacting plasticizers such as dibutyl sebacate may be added to the hydroxy ester copolymer to provide for flexible coatings and treated material.

Since certain changes may be made in the above invention and different embodiments of the processes and the products derived therefrom may be made without departing from the scope thereof, it is intended that the matter contained in the above description or drawing shall be interpreted as illustrative and not in a limiting sense.

I claim as my invention:

1. The process of producing a thermoset resinous member which comprises heating to a temperature of above 75° C. a body of the hydroxy ester reaction product of (A) the copolymer of one mole of an ethylenic carboxylic organic acid having a single >C=C< group and no other reactive groups than the carboxyl and ethylenic groups, from 0.9 to 2 moles of maleic anhydride for each carboxyl group in the organic acid, and from 1.9 to 10 moles of monostyrene, the copolymer having no polymer-forming ethylenic group, and (B) one mole of a hydrocarbon 1,2-monoepoxide for each carboxyl group in the organic acid, the epoxide having no other reactive group than the epoxy group, the epoxide having reacted with only the carboxyl groups in the organic acid to produce the hydroxy ester, the heating being sufficient to convert the reaction product into the thermoset state.

2. A composition of matter comprising the hydroxy ester reaction product of (A) the copolymer of one mole of an ethylenic carboxylic organic acid having a single >C=C< group and no other reactive groups than the carboxyl and ethylenic groups, from 0.9 to 2 moles of an organic acid anhydride of a monoethylenic dicarboxylic organic acid, the anhydride providing substantially at least a single >C=C< group for each carboxyl group in the organic acid, the anhydride having no other reactive groups than the anhydride and ethylenic groups, and from 1.9 to 10 moles of a non-acidic polymerizable monomer having a single H₂C=C< group, the copolymer having no polymer-forming ethylenic group, and (B) one mole of an epoxide for each carboxyl group in the organic acid, the epoxide having no other reactive group than the epoxy group the epoxide having reacted with only the carboxyl groups in the organic acid to produce the hydroxy ester.

3. A composition of matter comprising the hydroxy reaction product of (A) the copolymer of one mole of an ethylenic carboxylic organic acid having a single >C=C< group and no other reactive groups than the carboxyl and ethylenic groups, from 0.9 to 2 moles of maleic anhydride for each carboxyl group in the organic acid, and from 1.9 to 10 moles of monostyrene, the copolymer having no polymer-forming ethylenic groups and (B) one mole of a hydrocarbon 1,2-monoepoxide for each carboxyl group in the organic acid, the epoxide having no other reactive group than the epoxy group the epoxide having reacted only with the carboxyl groups in the organic acid to produce the hydroxy ester.

4. A composition of matter comprising the hydroxy reaction product of (A) the copolymer of one mole of acrylic acid, from 0.9 to 2 moles of maleic anhydride, and from 1.9 to 10 moles of monostyrene, the copolymer having no polymer-forming ethylenic groups and (B) one mole of a hydrocarbon 1,2-monoepoxide, the epoxide having no other reactive group than the epoxy group, the epoxide having reacted only with the carboxyl groups in the acrylic acid to produce the hydroxy ester.

5. A composition of matter comprising the hydroxy reaction product of (A) the copolymer of one mole of crotonic acid, from 0.9 to 2 moles of maleic anhydride, and from 1.9 to 10 moles of monostyrene, the copolymer having no polymer forming ethylenic groups and (B) one mole of a hydrocarbon 1,2-monoepoxide, the epoxide having no other reactive group than the epoxy group, the epoxide having reacted only with the carboxyl groups in the crotonic acid to produce the hydroxy ester.

6. A composition of matter comprising the hydroxy reaction product of (A) the copolymer of one mole of maleic acid, from 1.8 to 4 moles of maleic anhydride, and from 1.9 to 10 moles of monostyrene, the copolymer having no polymer-forming ethylenic groups and (B) one mole of propylene oxide, the propylene oxide having reacted only with the carboxyl groups in the maleic acid to produce the hydroxy ester.

7. The process of producing a thermoset resinous member comprising heating to a temperature of above 75° C. a body of the hydroxy ester reaction product of (A) the copolymer of one mole of a monoethylenic carboxylic acid having no other reactive groups than the carboxyl group and a >C=C< group, from 0.9 to 2 moles of a monoethylenic dicarboxylic acid anhydride, the anhydride having no other reactive groups than the anhydride and the >C=C< groups, the anhydride providing substantially at least one >C=C< group for each carboxyl group in the first mentioned monoethylenic carboxylic acid, and from 1.9 to 10 moles of a non-acidic polymerizable ethylenic monomer having a single H₂C=C< group, and (B) one mole of a hydrocarbon 1,2-monoepoxide having no other reactive group than the epoxy group for each carboxyl group in the first mentioned carboxylic acid, the epoxide having reacted only with the carboxyl groups to produce the hydroxy ester reaction product, the hydroxy ester having no polymer forming ethylenic groups, the heating being sufficient to convert the ester reaction product into the thermoset state.

8. The process of producing a laminated member comprising treating sheet fibrous material with a solution in a readily volatilized solvent of the hydroxy ester product of (A) the copolymer of one mole of a monoethylenic carboxylic acid having no other reactive groups than the carboxyl group and a >C=C< group, from 0.9 to 2 moles of a monoethylenic dicarboxylic acid anhydride, the anhydride having no other reactive groups than the anhydride and the >C=C< groups, the anhydride providing substantially at least one >C=C< group for each carboxyl group in the first mentioned monoethylenic carboxylic acid, and from 1.9 to 10 moles of a non-acidic polymerizable ethylenic monomer having a single $H_2C$=C< group, and (B) one mole of a hydrocarbon 1,2-monoepoxide having no other reactive group than the epoxy group for each carboxyl group in the first mentioned carboxylic acid, the epoxide having reacted only with the carboxyl groups to produce the hydroxy ester reaction product, the hydroxy ester having no polymer forming ethylenic groups, evaporating the solvent from the treated fibrous material, superimposing sheets of treated fibrous material, and subjecting the superimposed fibrous material to pressure at a temperature of above 75° C. to convert the reaction product to the thermoset state.

9. A composition of matter comprising the hydroxy ester reaction product of (A) the copolymer of one mole of a monoethylenic carboxylic acid having no other reactive groups than the carboxyl group and a >C=C< group, from 0.9 to 2 moles of a monoethylenic dicarboxylic acid anhydride, the anhydride having no other reactive groups than the anhydride and the >C=C< groups, the anhydride providing substantially at least one >C=C< group for each carboxyl group in the first mentioned monoethylenic carboxylic acid, and from 1.9 to 10 moles of a non-acidic polymerizable ethylenic monomer having a single $H_2C$=C< group, and (B) one mole of a hydrocarbon 1,2-monoepoxide having no other reactive group than the epoxy group for each carboxyl group in the first mentioned carboxylic acid, the epoxide having reacted only with the carboxyl groups to produce the hydroxy ester reaction product, the hydroxy ester having no polymer forming ethylenic groups, and up to one mole of an alcoholic hydroxy, non-cyclic aliphatic compound having at least 4 carbon atoms in a chain and substantially no polymer-forming ethylenic groups and no groups reactable with an acid anhydride other than the hydroxy group.

HERBERT F. MINTER.

REFERENCES CITED

The following references are of record in the file of this patent:

UNITED STATES PATENTS

| Number | Name | Date |
|---|---|---|
| 2,047,398 | Voss et al. | July 14, 1936 |
| 2,324,739 | Stoops et al. | July 20, 1943 |
| 2,418,688 | Atwood | Apr. 8, 1947 |